United States Patent
Sherman et al.

(10) Patent No.: US 10,936,756 B2
(45) Date of Patent: Mar. 2, 2021

(54) METHODOLOGY FOR FORMING A RESISTIVE ELEMENT IN A SUPERCONDUCTING STRUCTURE

(71) Applicants: Cory Edward Sherman, Arnold, MD (US); Shawn A. Keebaugh, Annapolis, MD (US); Reuben C. Ferguson, Richmond, VA (US)

(72) Inventors: Cory Edward Sherman, Arnold, MD (US); Shawn A. Keebaugh, Annapolis, MD (US); Reuben C. Ferguson, Richmond, VA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 760 days.

(21) Appl. No.: 15/411,090

(22) Filed: Jan. 20, 2017

(65) Prior Publication Data

US 2018/0212134 A1   Jul. 26, 2018

(51) Int. Cl.
*G06F 21/72* (2013.01)
*H01L 23/532* (2006.01)
(Continued)

(52) U.S. Cl.
CPC ........ *G06F 21/72* (2013.01); *H01L 23/5228* (2013.01); *H01L 23/53285* (2013.01); *H01L 27/18* (2013.01)

(58) Field of Classification Search
CPC ............................ G06F 21/72; H01L 23/5228
See application file for complete search history.

(56) References Cited

U.S. PATENT DOCUMENTS

| 7,724,117 | B2 | 5/2010 | Goyette et al. |
| 8,138,760 | B2 | 3/2012 | Bulatowicz |

(Continued)

FOREIGN PATENT DOCUMENTS

| EP | 0545811 A2 | 6/1993 |
| JP | 60140885 A | 7/1985 |
| JP | 60246601 A | 12/1985 |

OTHER PUBLICATIONS

Cooksey, J.W. et al., "Fabrication and characterization of vias for contacting YBa2Cu3O7-x multilayers," Physica C., vol. 282-287, Aug. 1997. [ages 683-684.

(Continued)

*Primary Examiner* — Paul A Wartalowicz
(74) *Attorney, Agent, or Firm* — Tarolli, Sundheim, Covell & Tummino LLP

(57) ABSTRACT

A method of forming a superconducting structure is provided that includes forming a superconducting element in a first dielectric layer, forming a protective pad formed from a resistive material over at least a portion of the superconducting element, forming a second dielectric layer overlying the first dielectric layer, and etching an opening through the second dielectric layer to the protective pad, such that no portion of the superconducting element is exposed in the opening. A cleaning process is performed on the superconducting structure, and a contact material fill with a resistive material is performed to fill the opening and form a resistive element in contact with the superconducting element through the protective pad.

15 Claims, 5 Drawing Sheets

(51) Int. Cl.
*H01L 23/522* (2006.01)
*H01L 27/18* (2006.01)

(56) References Cited

U.S. PATENT DOCUMENTS

| | | |
|---|---|---|
| 8,735,326 B2 | 5/2014 | Folk et al. |
| 8,852,959 B2 | 10/2014 | Talvacchio et al. |
| 9,252,208 B1 | 2/2016 | Morin et al. |
| 10,468,406 B2 | 11/2019 | Parke et al. |
| 2004/0099861 A1* | 5/2004 | Shoji .................. G01R 33/0354 257/31 |
| 2005/0062131 A1 | 3/2005 | Murduck et al. |
| 2018/0212134 A1 | 7/2018 | Sherman et al. |
| 2019/0194016 A1* | 6/2019 | Roberts .................. B82Y 10/00 |
| 2020/0013775 A1 | 1/2020 | Parke et al. |

OTHER PUBLICATIONS

International Search Report corresponding to International Application No. PCT/US2017/066970, dated Apr. 18, 2018.
Non Final Office Action for U.S. Appl. No. 16/577,629 dated Jun. 15, 2020.

* cited by examiner

METHODOLOGY FOR FORMING A RESISTIVE ELEMENT IN A SUPERCONDUCTING STRUCTURE

TECHNICAL FIELD

The present invention relates generally to superconductors, and more particularly to a methodology for forming a resistive element in a superconducting structure.

BACKGROUND

Superconducting circuits are one of the leading technologies proposed for quantum computing and cryptography applications that are expected to provide significant enhancements to national security applications where communication signal integrity or computing power are needed. They are operated at temperatures<100 kelvin. Efforts in fabrication of superconducting devices have mostly been confined to university or government research labs, with little published on the mass producing of superconducting devices. Therefore, many of the methods used to fabricate superconducting devices in these laboratories utilize processes or equipment incapable of rapid, consistent fabrication. Recently there has been a movement to mass production of superconducting circuits utilizing similar techniques as those utilized in conventional semiconductor processes.

One well-known semiconductor process is the formation of contacts and conductive lines in a multi-level interconnect stack to couple devices to one another over different layers of an integrated circuit. During the fabrication of superconducting circuits, via/trench structures are patterned, etched, filled with metal (e.g., niobium, tantalum, aluminum), then polished back using a chemical mechanical polishing (CMP) process. The next level dielectric is then deposited, and the sequence begins again, building up a multi-level interconnect stack.

In a conventional metal interconnect for microelectronic devices, via openings to underlying metals are cleaned, typically with a physical sputtering of the metal surface at the bottom of the via opening. This can result in re-deposition of the sputtered metal along the sidewalls. However, since the goal of conventional interconnect is to provide a continuous, low resistance electrical path, any re-deposited material has little-to-no impact on the conductivity of the metal filled in the via. Where the goal of the normal conducting material plug in superconducting electronics is to provide a small, resistive element between, for example, contacts in different layers, re-deposition of superconductor material can compromise the resistance of the normal conducting material plug by creating a shorting path.

SUMMARY

In one example, a method of forming a superconducting structure is provided. The method comprises forming a superconducting element in a first dielectric layer, forming a protective pad formed from a resistive material over at least a portion of the superconducting element, forming a second dielectric layer overlying the first dielectric layer, and etching an opening through the second dielectric layer to the protective pad, such that no portion of the superconducting element is exposed in the opening. The method further comprises performing a cleaning process on the superconducting structure, and performing a contact material fill with a resistive material to fill the opening and form a resistive element in contact with the superconducting element through the protective pad.

In yet another example, a method of forming a superconducting structure is provided. The method comprises forming a superconducting element in a first dielectric layer, such that the superconducting element has a top surface aligned with a top surface of the first dielectric layer, depositing a resistive material layer over the first dielectric layer, and etching away portions of the resistive material layer to form a resistive protective pad over at least a portion of the top surface of the superconducting element. The method further comprises forming a second dielectric layer overlying the first dielectric layer, etching an opening through the second dielectric layer to the protective pad, such that no portion of the superconducting element is exposed in the opening, and performing a cleaning process on the superconducting structure. A contact material fill is provided with the same resistive material of the resistive protective pad to fill the opening and form a resistive element in contact with the superconducting element through the protective pad, wherein the material of the resistive element has an operating temperature that is conductive but resistive at temperatures that the superconducting element is superconducting.

In yet a further example, a superconducting structure is provided that comprises a first dielectric layer having superconducting element, a protective pad formed from a resistive material overlying at least a portion of the superconducting element, and a second dielectric layer overlying the first dielectric layer. The second dielectric layer has a resistive element that extends from a top surface of the protective pad to a top surface of the second dielectric layer, wherein the protective pad is flared out to physically isolate the superconducting element from the resistive element, and wherein the material of the resistive element has an operating temperature that is conductive but resistive at temperatures that the superconducting element is superconducting.

DETAILED DESCRIPTION

The present invention is directed to a superconducting structure with a resistive element and a method of forming a resistor element in a superconducting structure. In one example, a thin layer of normal conducting material is deposited on a clean, planar superconducting material element surface. The normal conducting material is conductive but resistive at superconducting temperatures of the superconducting element. The normal conducting material layer is then patterned to form a protective pad over the superconducting material element that is of a sufficient size larger than the normal conducting material plug or resistive element that will contact from above. After patterning the thin normal conducting and resistive material layer, a dielectric is deposited over the device surface, and subsequently a via opening is patterned and etched, landing on the normal conducting and resistive material protective pad.

After removing the patterning (resist) layer, a cleaning process is used to remove any undesired surface layers, while the protective pad isolates the superconducting element from the cleaning process. A normal conducting and resistive material (same or similar) is then deposited on the surface of the device to fill the plug and form a resistive element or contact. The resulting device provides a via plug contact of normal conducting material that forms a resistive element coupled to a superconducting material element below with a clean interface.

Figure 1:
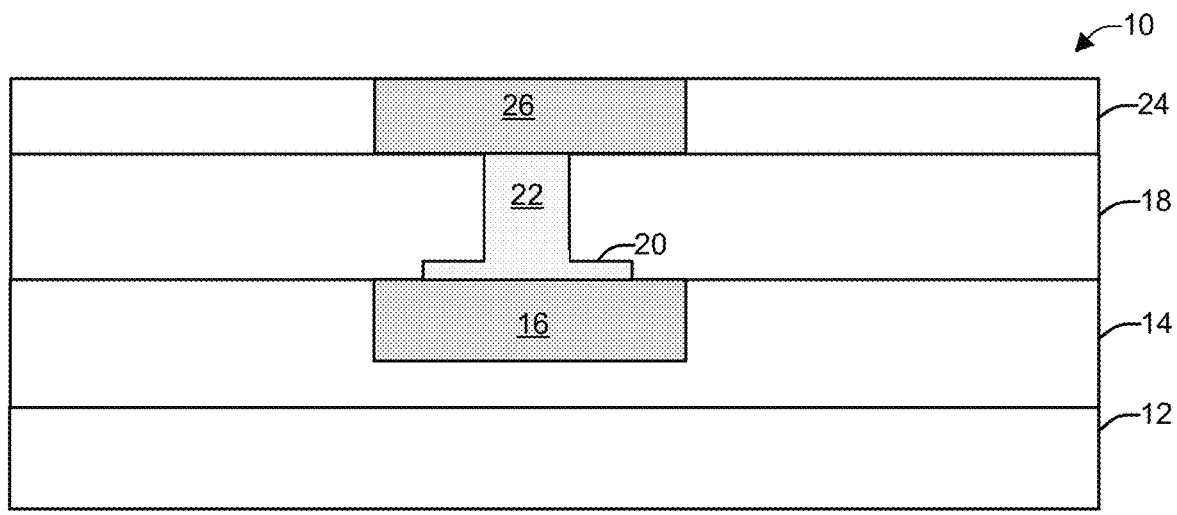
FIG. 1 illustrates a cross-sectional view of a superconductor interconnect structure.

FIG. 1 illustrates a cross-sectional view of a superconducting interconnect structure 10. The superconducting interconnect structure 10 includes a first dielectric layer 14 overlying a substrate 12. The substrate 12 can be formed of silicon, glass, or other substrate material. A second dielectric layer 18 overlies the first dielectric layer 14, and a third dielectric layer 24 overlies the second dielectric layer 18. One or more of the first, the second, and the third dielectric layers can be formed of a low temperature dielectric material that can be employed in low temperatures (e.g., less than or equal to 160 degrees Celsius) typically utilized in the formation of superconducting devices. Furthermore, one or more of the first, the second, and the third dielectric layers can be formed of a higher temperature dielectric material, such as a higher temp dielectrics like nitride, amorphous Si, or SiC. A first superconducting element 16 (e.g., superconducting line, superconducting contact) is embedded in the first dielectric layer 14. A resistive element 22 has a first surface in contact with the first superconducting element 16 and a second surface in contact with a second superconducting element 26. The resistive element 22 is coupled to the first superconducting element 16 through a resistive pad 20 that also protects the first superconducting element 16 from processes associated with the formation of the resistive element 22.

Each of the first and second superconducting elements 16 and 26 are formed of a superconducting material, such as niobium or tantalum. The resistive element 22 and the protective pad 20 are formed of a different material that is resistive at superconducting temperatures of the first and second superconducting elements 16 and 26. For example, the resistive element 22 and the protective pad 20 can be both formed of aluminum, which has an operating temperature that is conductive but resistive at temperatures that are greater than its superconducting temperature, but with a superconducting temperature that is below the superconducting temperature of the superconducting elements 16 and 26. The resistive element 22 and the protective pad 20 can be formed of the same resistive material, or different resistive materials. The protective pad 20 is disposed between the first superconducting element and the resistive element 22 to assure that the side walls of the via in dielectric layer 18 for forming the resistive element do not get contaminated by superconducting material during a cleaning process performed prior to deposition of the resistive material into the via that forms the resistive element. This helps facilitate the avoidance of forming a short between the first superconducting element 16 and the second superconducting element 26 by sputtered superconducting materials during the via formation.

Turning now to FIGS. 2-13, fabrication is discussed relative to the formation of the superconducting device of FIG. 1. It is to be appreciated that the present example is discussed with respect to a process flow that forms a resistive structure between superconducting lines, but could be employed to provide a variety of resistive element in a superconducting structures.

Figure 2:
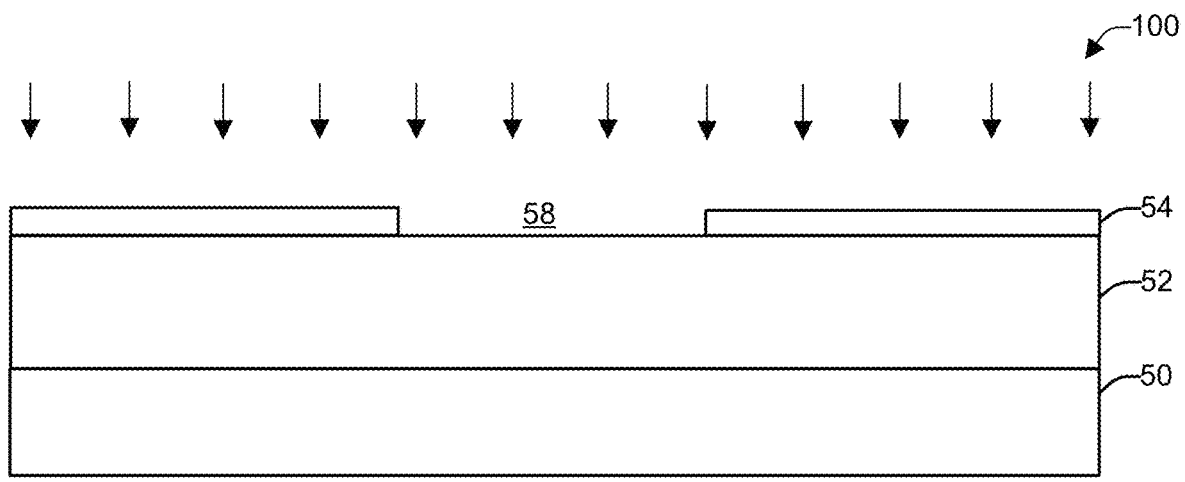
FIG. 2 illustrates a schematic cross-sectional view of a superconducting structure after a photoresist material layer has been deposited and patterned, and while undergoing an etch process.

FIG. 2 illustrates a cross-sectional view of a superconducting structure in its early stages of fabrication. The superconducting structure includes a first dielectric layer 52 overlying an underlying substrate 50. The underlying substrate 50 can be, for example, a silicon or glass wafer that provides mechanical support for the first dielectric layer 52 and subsequent overlying layers. Any suitable technique for forming the first dielectric layer 52 may be employed such as Thermal Oxidation, Low Pressure Chemical Vapor Deposition (LPCVD), Plasma Enhanced Chemical Vapor Deposition (PECVD), High Density Plasma Chemical Vapor Deposition (HDPCVD), sputtering, or spin-on techniques to a thickness suitable for providing an interconnect layer.

As illustrated in FIG. 2, a photoresist material layer 54 has been applied to cover the structure, and patterned and developed to expose opening 58 in the photoresist material layer 54 in accordance with a trench pattern. The photoresist material layer 54 can have a thickness that varies in correspondence with the wavelength of radiation used to pattern the photoresist material layer 54. The photoresist material layer 54 may be formed over the first dielectric layer 52 utilizing spin-coating or spin casting deposition techniques, selectively irradiated (e.g., with deep ultraviolet (DUV) irradiation), and developed to form the opening 58.

FIG. 2 also illustrates performing of an etch 100 (e.g., anisotropic reactive ion etching (RIE)) on the first dielectric layer 52 to form extended opening 60 (FIG. 3) in the first dielectric layer 52 based on the pattern in the photoresist material layer 54. The etch step 100 can be a dry etch and employ an etchant which selectively etches the first dielectric layer 52 at a faster rate than the overlying photoresist material layer 54. For example, the first dielectric layer 52 may be anisotropically etched with a plasma gas(es), herein carbon tetrafluoride ($CF_4$) containing fluorine ions, in a commercially available etcher, such as a parallel plate RIE apparatus or, alternatively, an electron cyclotron resonance (ECR) plasma reactor to replicate the mask pattern of the patterned photoresist material layer 54 and thereby create the extended trench opening 60. The photoresist material layer 54 is thereafter stripped (e.g., ashing in an $O_2$ plasma) so as to result in the structure shown in FIG. 3.

Figure 3:
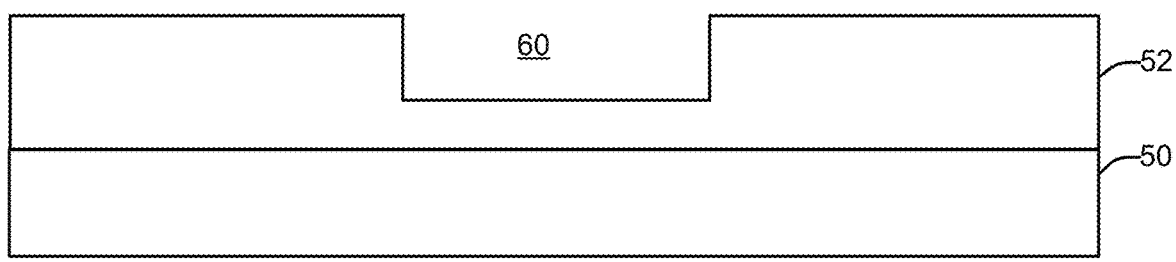
FIG. 3 illustrates a schematic cross-sectional view of the structure of FIG. 2 after the etch process and after the photoresist material layer has been stripped.
Figure 4:
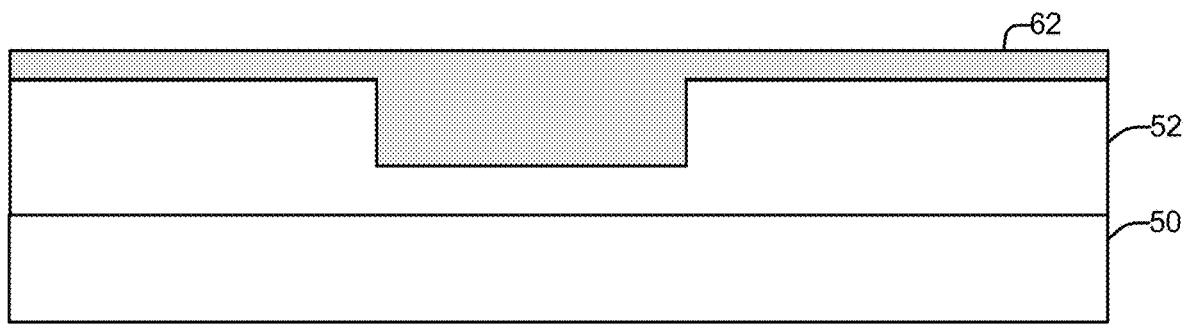
FIG. 4 illustrates a schematic cross-sectional view of the structure of FIG. 3 after a contact material fill in a material deposition chamber.

Next, the structure of FIG. 3 undergoes a trench material fill to deposit a superconductor material 62, such as niobium or tantalum, into the extended trench opening 60 to form the resultant structure shown in FIG. 4. The-trench material fill can be deposited employing a standard trench material deposition such as Physical Vapor Deposition (PVD) or Evaporation. Following deposition of the trench material fill, the superconducting material 62 is polished utilizing chemical mechanical polishing (CMP) down to the surface level of the first dielectric layer 52 to form a superconducting element 64, resulting in the structure of FIG. 5.

Figure 5:
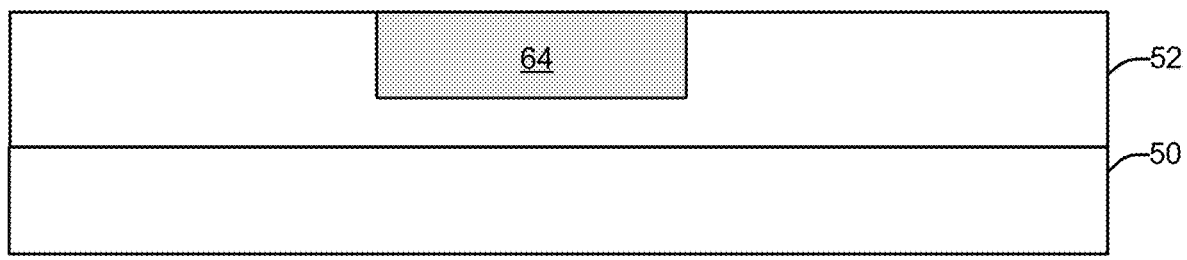
FIG. 5 illustrates a schematic cross-sectional view of the structure of FIG. 4 after undergoing a chemical mechanical polish.
Figure 6:
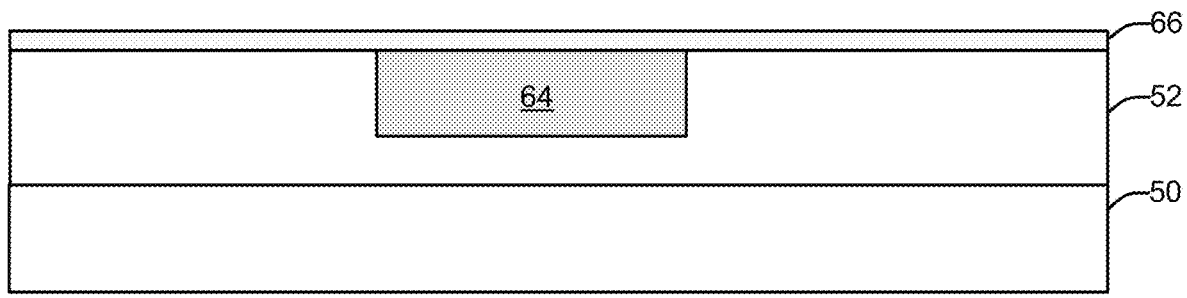
FIG. 6 illustrates a schematic cross-sectional view of the structure of FIG. 5 after deposition of a resistive material layer.
Figure 7:
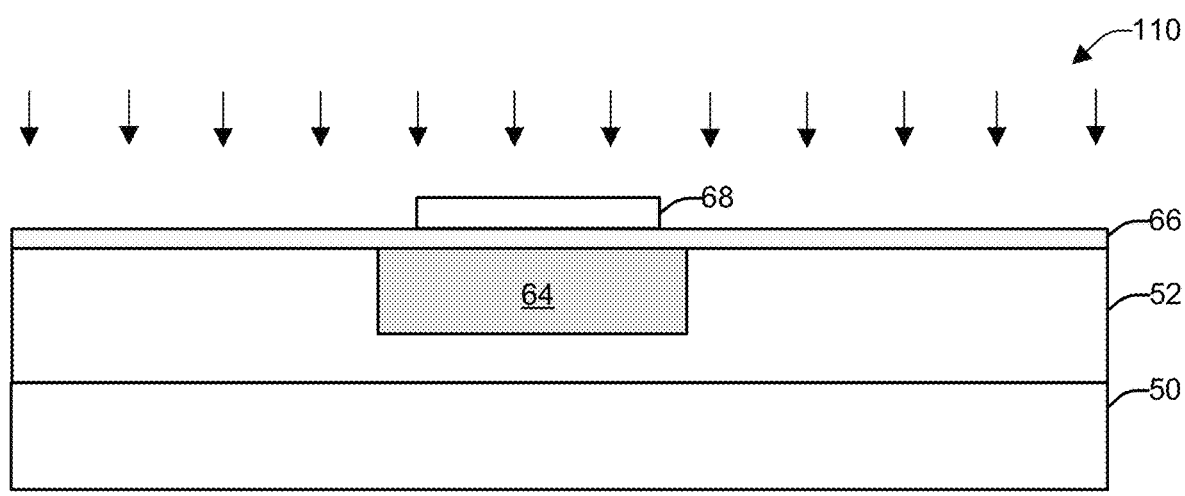
FIG. 7 illustrates a schematic cross-sectional view of the superconducting structure of FIG. 6 after a photoresist material layer has been deposited and patterned, and while undergoing an etch process.

Next, a resistive material deposition is performed to deposit a resistive material layer 66, such as aluminum, over the structure of FIG. 5, resulting in the structure shown in FIG. 6. The resistive material can be deposited employing a standard material deposition process such as PVD or evaporation. The resistive material is conductive but resistive at superconducting temperatures of the superconducting elements formed in the superconducting structure. As illustrated in FIG. 7, a photoresist material layer 68 has been applied to cover the structure, and patterned and developed to form a protective pad area (see FIG. 8) of the resistive material layer 66, exposing the remaining portions of the resistive material layer 66.

FIG. 7 also illustrates performing of an etch 110 (e.g., anisotropic reactive ion etching (RIE)) on the resistive material layer 66 to form a resistive protective pad 70 overlying at least a portion of the superconducting element 64. The etch step 110 can be a metal etch with an etchant which selectively etches the underlying resistive conducting material at a faster rate than the underlying first dielectric layer 52, the underlying superconducting layer 64, and the overlying photoresist material layer 68. The photoresist material layer 68 is thereafter stripped (e.g., ashing in an $O_2$ plasma) so as to result in the structure shown in FIG. 8.

Figure 8:
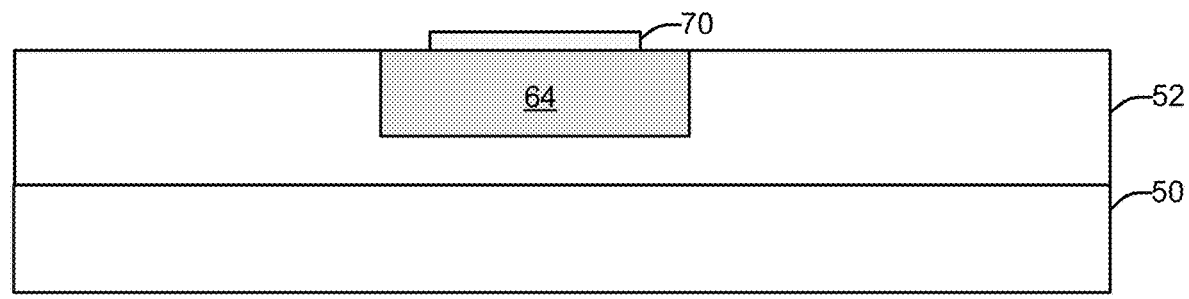
FIG. 8 illustrates a schematic cross-sectional view of the structure of FIG. 7 after the etch process and after the photoresist material layer has been stripped.
Figure 9:
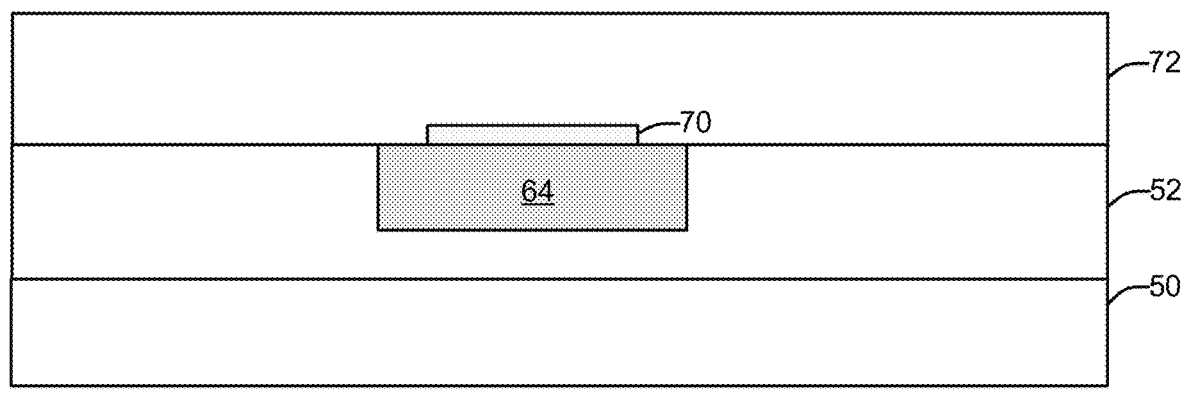
FIG. 9 illustrates a schematic cross-sectional view of the structure of FIG. 8 after undergoing deposition of a second dielectric layer.

A second dielectric layer 72 is then deposited over the structure FIG. 8 to form the structure of FIG. 9. Any suitable technique for forming the second dielectric layer 72 may be employed such as Low Pressure Chemical Vapor Deposition (LPCVD), Plasma Enhanced Chemical Vapor Deposition (PECVD), High Density Plasma Chemical Vapor Deposition (HDPCVD), sputtering, or spin-on techniques to a thickness suitable for providing the second dielectric layer 72. Furthermore, depending on the method of forming the dielectric layer 72, it may be polished utilizing chemical mechanical polishing (CMP) to provide a planar surface for subsequent processing.

Figure 10:
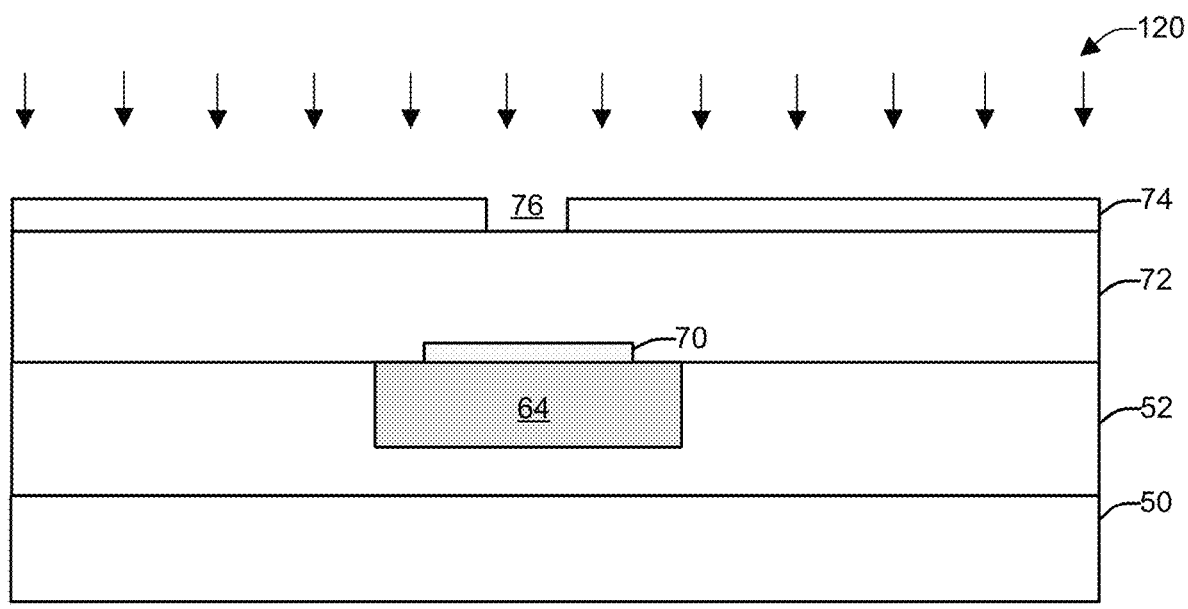
FIG. 10 illustrates a schematic cross-sectional view of the superconducting structure of FIG. 9 after a photoresist material layer has been deposited and patterned, and while undergoing an etch process.

As illustrated in FIG. 10, a photoresist material layer 74 has been applied to cover the structure, and patterned and developed to expose a via opening 76 in the photoresist material layer 74 in accordance with a via pattern. FIG. 10 also illustrates performing of an etch 120 (e.g., anisotropic reactive ion etching (RIE)) on the second dielectric layer 72 to form extended via opening 78 (FIG. 11) in the second dielectric layer 72 based on the via pattern in the photoresist material layer 74. The etch step 120 can be a dry etch and employ an etchant which selectively etches the underlying second dielectric layer 72 at a faster rate than the underlying protective pad 70 and the overlying photoresist material layer 74. The photoresist material layer 74 is thereafter stripped (e.g., ashing in an $O_2$ plasma), so as to result in the structure shown in FIG. 11.

Figure 11:
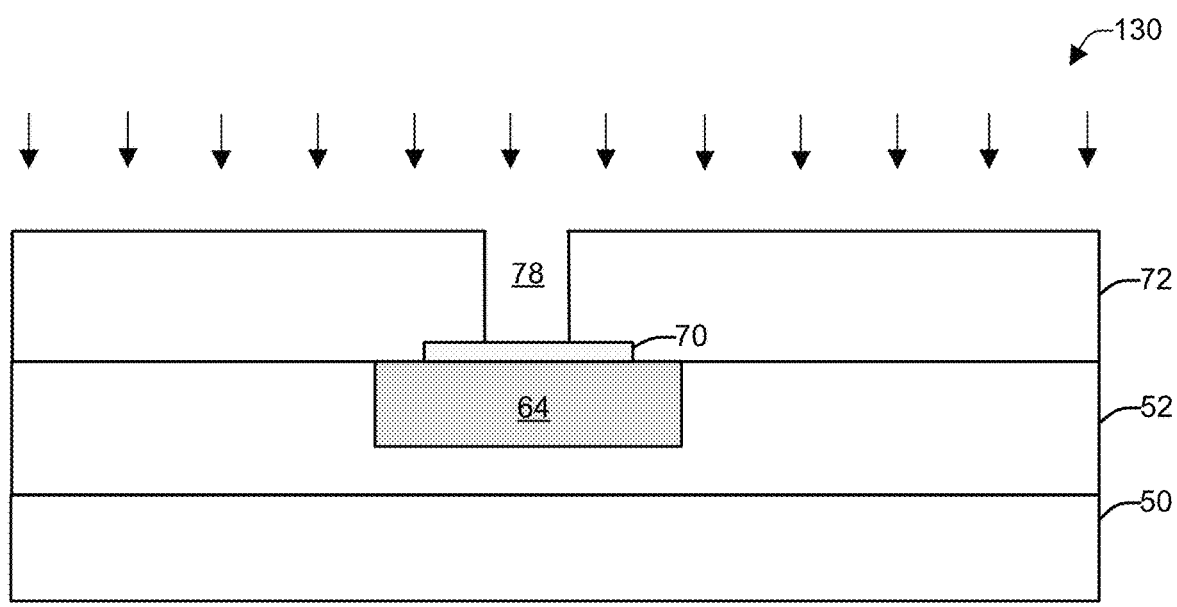
FIG. 11 illustrates a schematic cross-sectional view of the structure of FIG. 10 after the etch process and after the photoresist material layer has been stripped, and while undergoing a preclean process.

The resultant structure of FIG. 11 is then placed into a preclean chamber to undergo a precleaning process 130. The resistive protective pad 70 assures that no portion of the superconducting element 64 is exposed in the opening 78 during the precleaning process 130. The resultant structure could have an oxidized surface layer on the resistive protective pad 70 due to its exposure to oxygen during processing. The purpose of the precleaning process is to remove these oxide layers from the metal surfaces prior to the resistive material deposition 80 in FIG. 12. A typical precleaning process is an argon sputter clean. The resistive protective pad 70 protects the top surface of the superconducting element 64 from the argon sputter clean. For example, the resistive material from the restive protective pad 70 may be deposited along the sidewalls of the via during an argon sputter cleaning process, as opposed to the superconducting material being deposited along the sidewalls causing a short around the resistive element between superconducting elements.

Figure 12:
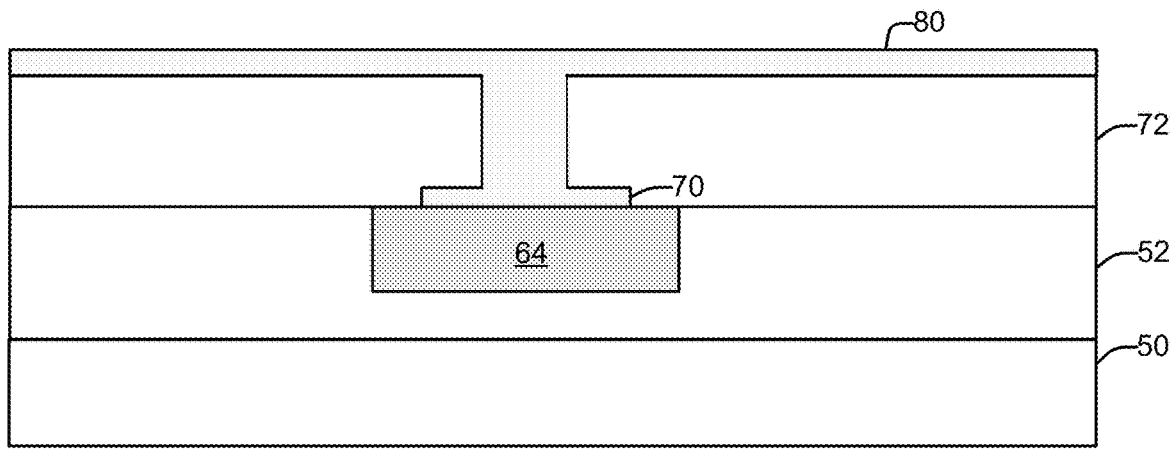
FIG. 12 illustrates a schematic cross-sectional view of the structure of FIG. 11 after a contact material fill in a material deposition chamber.
Figure 13:
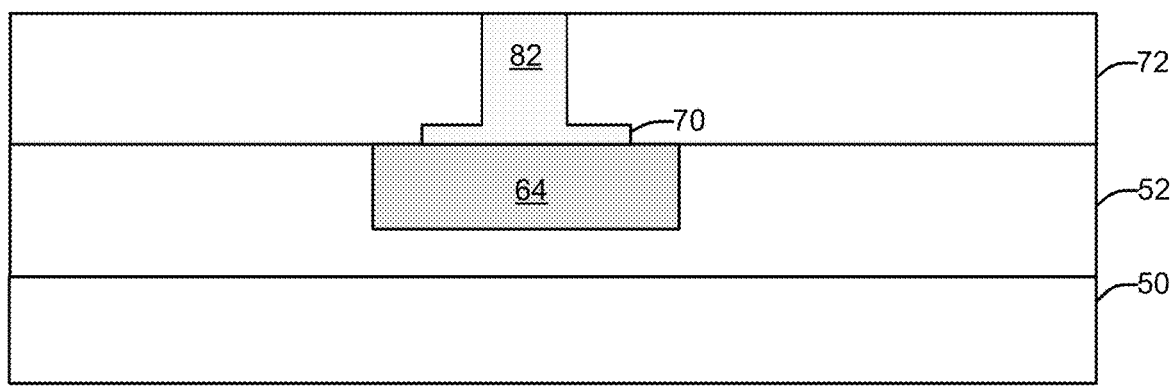
FIG. 13 illustrates a schematic cross-sectional view of the structure of FIG. 12 after undergoing a chemical mechanical polish.

Next, the structure is placed into a material deposition chamber and undergoes a contact material fill to deposit a resistive material 80, such as aluminum, into the via opening 78 of FIG. 11 to form the resultant structure shown in FIG. 12. The resistive material fill can be deposited employing a standard contact material deposition such as PVD or evaporation. The resistive material fill can be, for example, aluminum. Following deposition of the resistive material fill 80, the structure is polished utilizing chemical mechanical polishing (CMP) down to the surface level of the second dielectric layer 72 to form a resistive element 82 and to provide the resultant structure of FIG. 13. The subsequent dielectric layer can then be further processed for subsequent interconnect layers, for example, to provide a subsequent dielectric layer with a second superconducting element coupled to a top end of the resistive element 82 similar to the structure shown in FIG. 1.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A method of forming a superconducting structure, the method comprising:
    forming a superconducting element in a first dielectric layer;
    forming a protective pad over at least a portion of the superconducting element, the protective pad consisting entirely of a resistive material;
    forming a second dielectric layer overlying the first dielectric layer;
    etching an opening through the second dielectric layer to the protective pad, such that no portion of the superconducting element is exposed in the opening;
    performing a cleaning process on the resulting structure due to the etching; and
    performing a contact material fill with a resistive material to fill the opening and form a resistive element in contact with the superconducting element through the protective pad, wherein the resistive element is resistive and the superconducting element is superconducting at a same operating temperature.

2. The method of claim 1, wherein the cleaning process is an argon sputter clean process.

3. The method of claim 1, wherein the superconducting element is formed from one of niobium and tantalum.

4. The method of claim 1, wherein the resistive element and the protective pad are formed from aluminum.

5. The method of claim 1, further comprising performing a chemical mechanical polish (CMP) to align a top surface of the resistive element with a top surface of the second dielectric layer.

6. The method of claim 1, wherein the dielectric material employed in the first dielectric layer and the second dielectric layer is formed of a dielectric material that can form at a temperature of about or below 160° Celsius.

7. The method of claim 1, further comprising forming a second superconducting element in a third dielectric layer overlying the second dielectric layer, wherein the second superconducting element is in contact with a top surface of the resistive element.

8. The method of claim 1, wherein the forming a protective pad comprises depositing a resistive material layer over the first dielectric layer, and etching away portions of the resistive material layer to form the protective pad.

9. A method of forming a superconducting structure, the method comprising:
    forming a superconducting element in a first dielectric layer, the superconducting element having a top surface aligned with a top surface of the first dielectric layer;
    depositing a resistive material layer over the first dielectric layer;
    etching away portions of the resistive material layer to form an entirely resistive protective pad over at least a portion of the top surface of the superconducting element;
    forming a second dielectric layer overlying the first dielectric layer;
    etching an opening through the second dielectric layer to the entirely resistive protective pad, such that no portion of the superconducting element is exposed in the opening;
    performing a cleaning process on the resulting structure due to the etching; and
    performing a contact material fill with the same resistive material of the resistive protective pad to fill the opening and form a resistive element in contact with the superconducting element through the protective pad, wherein the material of the resistive element is resistive and the superconducting element is superconducting at a same operating temperature.

10. The method of claim 9, wherein the cleaning process is an argon sputter clean process.

11. The method of claim 9, wherein the superconducting element is formed from one of niobium and tantalum.

12. The method of claim 9, wherein the resistive element and the protective pad are formed from aluminum.

13. The method of claim 9, further comprising performing a chemical mechanical polish (CMP) to align a top surface of the resistive element with a top surface of the second dielectric layer.

14. The method of claim 9, further comprising forming a second superconducting element in a third dielectric layer overlying the second dielectric layer, wherein the second superconducting element is in contact with a top surface of the resistive element.

15. The method of claim 14, wherein the first and second superconducting elements are conductive lines and the resistive element is a resistor that couples the first superconducting element with the second superconducting element.

* * * * *